L. LEIGH.
APPARATUS FOR BOILING AND DYEING SILKS, &c.

No. 180,895.   Patented Aug. 8, 1876.

WITNESSES:
E. Wolff
John Goethals

INVENTOR:
L. Leigh
BY Munn & Co
ATTORNEYS.

N. PETERS, PHOTO-LITHOGRAPHER, WASHINGTON D. C.

UNITED STATES PATENT OFFICE.

LEWIS LEIGH, OF PITTSFIELD, MASSACHUSETTS.

IMPROVEMENT IN APPARATUS FOR BOILING AND DYEING SILKS, &c.

Specification forming part of Letters Patent No. 180,895, dated August 8, 1876; application filed May 26, 1876.

*To all whom it may concern:*

Figure 1:
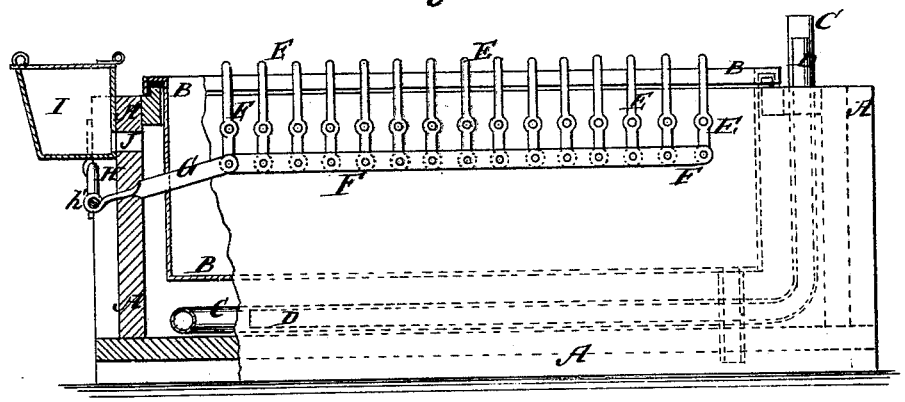
Figure 2:
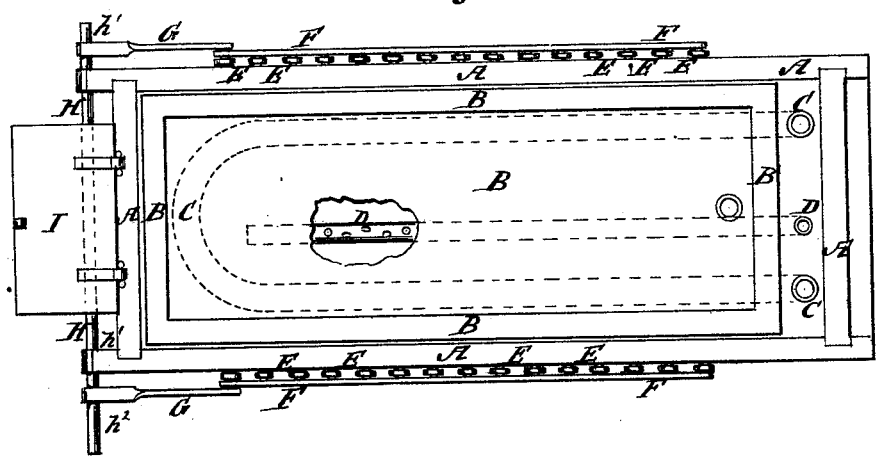

Be it known that I, LEWIS LEIGH, of Pittsfield, in the county of Berkshire, and in the State of Massachusetts, have invented a new and Improved Apparatus for Boiling and Dyeing Silks, &c., of which the following is a specification:

Figure 1 is a side view of my improved apparatus, partly in section, to show the construction. Fig. 2 is a top view of the same.

The object of this invention is to furnish an improved apparatus for boiling and dyeing silk, thread, and other fibrous material, which shall be so constructed as to enable the liquid to be raised to and kept steadily at the desired temperature without ebullition, and thus without tangling or snarling the material.

The invention consists in the combination of the series of fingers, their connecting-rods, and an operating mechanism, with the two vats, as hereinafter described, for moving the rods that support the material being boiled or dyed, and in the combination, with the end of the outer vat, of a box, connected with the space between the two vats by an opening, as hereinafter fully described.

A is the outer or wooden vat, and B is the inner or copper vat, which vats are connected together steam-tight at their upper edges. The liquid in which the material is to be boiled or dyed is placed in the inner vat B, and in the space between the vats A B is placed a liquid that boils at a higher temperature than the liquid in the inner vat B, so that the liquid in said vat B can be raised to and kept at any desired temperature. The liquid in the vat A may be heated by steam circulating through a bent or coiled pipe, C, or introduced into said vat A through a perforated pipe, D. The hanks of the material to be boiled or dyed are placed upon rods which are placed parallel with each other upon the side edges of the vat B, between the upward-projecting ends of the fingers E. The fingers E are pivoted to the sides of the vat A, near its upper edge, and their lower ends are pivoted to the rods F, to the forward ends of which are pivoted the ends of the connecting-rods G. The forward ends of the rods G are pivoted to short cranks $h^1$, formed upon the shaft H, which is pivoted to the end of the vat B, and to which is attached a long crank or lever, $h^2$, by which it is rocked to vibrate the fingers E. The fingers E may be vibrated by any other desired mechanism. To the forward end of the vat A is attached box I, which rises higher than the vat A, and from the lower part of which a slot, J, leads through the end of the vat A into the upper part of the space between the vats A B. The box I receives the wash from the ebullition of the liquid in the vat A, and, being higher than the said vat, allows the liquid to flow back into the vat, thus avoiding any risk from boiling a liquid in an air-tight space.

Having thus described my invention, what I claim as new, and desire to secure by Letters Patent, is—

1. The combination of the series of fingers E, their connecting-rods F, and operating mechanism, with the vat B, substantially as herein shown and described, for moving the rods that support the material being boiled or dyed, as set forth.

2. In an apparatus for boiling and dyeing silk, the combination, with the outer and inner vats. A B, of an expansion-chamber, I, attached to the outer vat, communicating therewith, extending above it, and having a closed top, as shown and described, to operate as specified.

LEWIS LEIGH.

Witnesses:
WILLIAM T. FILLEY,
JOHN F. VAN DEUSEN.